United States Patent Office 2,717,220
Patented Sept. 6, 1955

2,717,220

HEAT RESISTANT FABRIC COATED WITH A FUSED COMPOSITION COMPRISING POLYTETRAFLUOROETHYLENE AND CRYOLITE, AND METHOD OF PRODUCING SAME

Robert E. Fay, Jr., Highland Mills, N. Y., assignor to E. I. du Pont de Nemours and Company, Wilmington, Del., a corporation of Delaware No Drawing. Application June 4, 1953,
Serial No. 359,640

6 Claims. (Cl. 117—126)

This invention relates to modified polytetrafluoroethylene coated or impregnated substrates and a method of producing same, and, more particularly, to glass fabrics coated or impregnated with modified polytetrafluoroethylene coating compositions.

Polytetrafluoroethylene is a polymeric film forming material which has several outstanding properties, such as insolubility in all known solvents, resistance to very high temperatures which will adversely affect all known organic film forming substances, resistance to abrasion, unusual electrical properties; e. g., high dielectric strength, high insulation resistance and extremely low power factor.

Some of the disadvantages of polytetrafluoroethylene films include the relatively low tensile and tear strengths. To compensate for the relatively low tensile and tear strengths, fabrics have been used in conjunction with the polytetrafluoroethylene films and coatings as a reinforcement. The reinforcing fabrics have been primarily limited to glass since the polytetrafluoroethylene coating is usually applied as an aqueous suspensoid which requires heating to at least 621° F. to sinter or coalesce the particles of polytetrafluoroethylene, which high temperature will burn or char fabrics made from organic fibers.

A fused polytetrafluoroethylene coated and/or impregnated glass fabric has considerably more tensile strength than an unsupported fused polytetrafluoroethylene film. There is very little, if any, improvement in the tear strength of fused polytetrafluoroethylene coated glass fabric over that of an unsupported fused film of polytetrafluoroethylene. In most of the applications where polytetrafluoroethylene coated glass fabrics are employed, such as, e. g., electrical and heat insulation, the tensile strength is far in excess of the requirements but there is need for improvement in the resistance to tearing.

The primary object of this invention is the provision of a modified polytetrafluoroethylene coated heat resistant fabric which has improved resistance to tearing.

The objective of this invention is accomplished by coating or impregnating a heat resistant fabric base with an aqueous suspension comprising polytetrafluoroethylene and particulate cryolite and heating the coating to at least 621° F. to fuse or sinter the coating. Cryolite is sodium aluminum fluoride, sometimes referred to as Greenland spar or ice stone.

The following specific example is an illustration of an embodiment of the invention and is referred to as Example 5 in Table I.

The following mill base composition was ground in a ball mill for 72 hours.

Mill base: Per cent by wt.
 Cryolite (sodium aluminum fluoride)_____ 50
 Water _____ 49
 Dispersing agent_____ 1

100

After grinding, the above mill base composition was blended with an aqueous suspensoid or dispersion of polytetrafluoroethylene by gentle stirring in accordance with the following proportions to form the coating composition:

Coating composition: Per cent by wt.
 Aqueous suspensoid of polytetrafluoroethylene (45.0% polytetrafluoroethylene, 2.7% dispersing agent and 52.3% water)_____ 81.6
 Mill base (above)_____ 18.4

100.0

The ratio of dry cryolite to dry polytetrafluoroethylene in the above coating composition is 20:80. The dispersing agent in the mill base and the polymeric suspensoid was a polyethylene glycol ether of an alkylated phenol (a non-ionic dispersing agent known commercially as "Triton" X–100). This particular dispersing agent is not critical since other well known wetting agents may be used.

The aqueous suspensoid of polytetrafluoroethylene may be prepared in accordance with the teaching in U. S. Patent 2,478,229. The particulate cryolite was a commercial grade having a specific gravity of 2.9–3.0.

A standard woven glass fabric identified as ECC–11–108 Fiberglas having the following specification Thickness_____ 2 mils
Thread count_____ 60 x 47
Yarn size_____ 900–½
Ounces per sq. yd._____ 1.43 was given two dip coats in the above coating composition. After each successive dip coat, the coated fabric was passed through a heat zone at a rate of about 1½ yards per minute during which the coating was heated to at least 621° F. to dry and sinter the coating. Approximately three ounces per square yard of non-volatile components of the coating composition were applied to the glass fabric in the two dip coats.

In addition to the 20:80 ratio of cryolite to polytetrafluoroethylene employed in the above described coated fabric, the same glass fabric was coated and the coating fused in a like manner with other similar coating compositions. The other ratios of dry cryolite to dry polytetrafluoroethylene were 5:95, 10:90, 15:85, 25:75, 30:70 and 40:60, as well as a coating composition containing only water, dispersing agent and polytetrafluoroethylene; i. e. no cryolite, as a control. The following Table I gives the formulae of the various coatings and tear results of the coated glass fabrics with the different ratios of cryolite to polytetrafluoroethylene:

Table I

| Example | 1 | 2 | 3 | 4 | 5 | 6 | 7 | 8 |
|---|---|---|---|---|---|---|---|---|
| Ratio of Cryolite to Polytetrafluoroethylene | 0/100 (Control) | 5/95 | 10/90 | 15/85 | 20/80 | 25/75 | 30/70 | 40/60 |
| Coating Composition, Parts by Wt.: | | | | | | | | |
| Cryolite | | 5.0 | 10.0 | 15.0 | 20.0 | 25.0 | 30.0 | 40.0 |
| Polytetrafluoroethylene | 100.0 | 95.0 | 90.0 | 85.0 | 80.0 | 75.0 | 70.0 | 60.0 |
| Dispersing Agent—"Triton" X-100 | 6.0 | 5.8 | 5.6 | 5.4 | 5.2 | 5.0 | 4.8 | 4.4 |
| Water | 116.2 | 115.3 | 114.4 | 113.5 | 112.6 | 111.7 | 110.8 | 109.0 |
|  | 222.2 | 221.1 | 220.0 | 218.9 | 217.8 | 216.7 | 215.6 | 213.4 |
| Dry Weight of Coating on Glass Fabric, Ounces per Sq. Yd. | 2.80 | 2.82 | 2.64 | 2.87 | 2.91 | 2.72 | 3.01 | 2.84 |
| Elmendorf Tear Strength, Lbs.: | | | | | | | | |
| Warp | 0.48 | 0.58 | 0.83 | 1.15 | 0.97 | 0.59 | 0.69 | 0.58 |
| Filler | 0.27 | 0.41 | 0.58 | 0.60 | 0.53 | 0.43 | 0.41 | 0.42 |
| Tensile (Grab), Lbs.: | | | | | | | | |
| Warp | 72 | 70 | 83 | 85 | 85 | 88 | 72 | 70 |
| Filler | 63 | 62 | 53 | 76 | 80 | 60 | 50 | 64 |
| Average of Warp and Filler | 67.5 | 66 | 68 | 80.5 | 82.5 | 74 | 61 | 67 |
| Bursting Strength, Lbs. | 116 | 80 | 96 | 95 | 106 | 114 | 80 | 74 |

The Elmendorf tear test was carried out on the Elmendorf Tear Test Machine as described in Federal Specification Textile Test Method CCC-T-191b, dated May 15, 1951, Method 5132.
The Bursting Strength Test was carried out in accordance with Method 5122 of the same Federal Specification.

The above data indicate that there is no particular advantage to be gained, with respect to tear strength of the coated glass fabric, with compositions containing less than 5% cryolite, based on the combined weight of cryolite and polytetrafluoroethylene. Compositions which contain more than 40% cryolite, same weight basis, do not form satisfactory coating compositions due to severe settling problems and uneven coating distribution. The preferred range is 10% to 20% cryolite, same weight basis.

The coating composition employed in Examples 1 (control-no cryolite) and 5 (20 parts of cryolite to 80 parts of polytetrafluoroethylene) were cast on smooth metal plates and, after the volatile portion of each composition was evaporated, the films were heated to at least 621° F. while supported on the metal plates. After cooling to room temperature the films were stripped from the metal plates and tested for tear strength. The results were:

Table II

|  | Unsupported Films | |
|---|---|---|
|  | Composition of Example 1 | Composition of Example 5 |
| Ratio of Cryolite to Polytetrafluoroethylene | 0/100 (Control) | 20/80 |
| Tear Strength, Grams/Mil Thickness of Film | 27.0 | 8.6 |

In view of the above data it was surprising and unexpected that the polytetrafluoroethylene coatings containing 5 to 40% cryolite, based on combined weight of polytetrafluoroethylene and cryolite, applied to glass fabrics would result in tear strengths greater than glass fabrics coated with polytetrafluoroethylene alone.

In addition to the woven glass fabric mentioned above, other glass fabrics of heavier or lighter weight, as well as non-woven glass fabric may be used. Other woven or non-woven heat resistant fabrics may be used which are capable of withstanding the fusion temperature of the polytetrafluoroethylene, such as, e. g., asbestos fabric. In addition, the heat treated polyacrylonitrile fabrics disclosed in copending application S. N. 263,500, filed December 26, 1951, by C. R. Humphreys, may be used in place of the glass fabric.

There are no particular limits for the amount of cryolite/polytetrafluoroethylene to be applied to the heat resistant fabric base in order to obtain the advantages of this invention. In general the heavier the fabric the greater the amount of coating applied. The coating is usually sufficient to fill the interstices and provide a smooth coating. In some cases, where porosity of the coated fabric is desired, the coating may be insufficient to completely fill all the interstices.

Throughout the specification and claims the terms "impregnated" and "coated" are used synonymously.

It is apparent that many widely different embodiments of this invention may be made without departing from the spirit and scope thereof and, therefore, it is not intended to be limited except as indicated in the appended claims.

I claim:

1. A heat resistant fabric coated with a fused composition comprising polytetrafluoroethylene and cryolite, said cryolite representing 5% to 40% of the combined weight of cryolite and polytetrafluoroethylene.

2. The product of claim 1 in which the cryolite represents 10% to 20% of the combined weight of cryolite and polytetrafluoroethylene.

3. The product of claim 1 in which the heat resistant fabric is glass fabric.

4. The product of claim 1 in which the heat resistant fabric is asbestos fabric.

5. The product of claim 1 in which the heat resistant fabric is heat treated polyacrylonitrile fabric.

6. The process of producing an impregnated glass fabric characterized by improved resistance to tear which comprises impregnating a glass fabric with an aqueous suspension of cryolite and polytetrafluoroethylene, said cryolite representing 5% to 40% of the combined weight of cryolite and polytetrafluoroethylene, and heating the coating to at least 621° F. to fuse the polytetrafluoroethylene.

References Cited in the file of this patent

UNITED STATES PATENTS

| 2,392,388 | Joyce | Jan. 8, 1946 |
| 2,562,117 | Osdal | July 24, 1951 |

OTHER REFERENCES

Handbook of Plastics by Simonds, et al., D. Van Nostrand Co. Inc., pp. 308-311, 2d ed., 1-49.